Sept. 2, 1952    H. L. MUELLER    2,609,244
VEHICLE WHEEL
Filed Sept. 28, 1948

INVENTOR.
HOMER L. MUELLER
BY
Oberlin & Limbach
ATTORNEYS.

Patented Sept. 2, 1952

2,609,244

UNITED STATES PATENT OFFICE 2,609,244

VEHICLE WHEEL

Homer L. Mueller, Cleveland, Ohio, assignor to The Cleveland Welding Company, Cleveland, Ohio, a corporation of Ohio Application September 28, 1948, Serial No. 51,535

5 Claims. (Cl. 301—13)

The present improvements relating generally as indicated to a vehicle wheel have more particular regard to a wheel on which pneumatic tires are adapted to be detachably mounted. More specifically, the present invention is concerned with improvements in a so-called "dual wheel" on which a pair of coaxially adjacent tires are adapted to be detachably mounted.

Wheels of the character indicated in general use as the driving wheels of trucks, busses, and like vehicles ordinarily comprise a central portion of relatively rigid and heavy cast steel construction detachably supporting a pair of rims thereabout with said rims held in axially spaced relation as by a spacer band encircling said central portion and disposed between said rims, said wheels because of such cast steel construction being unnecessarily heavy and costly to manufacture.

Accordingly, it is a primary object of this invention to provide a built-up fabricated wheel of light weight, resilient construction which may be economically manufactured.

Another object of this invention is to provide a wheel in which the central or flange portion is of a light-weight pressed steel construction including axially spaced rings or flanges attached at their inner edges to a central hub and free to be flexed toward one another at their outer edges.

Still another object of this invention is to provide a wheel having a central portion including pressed steel rings thereon of radially curved cross-section whereby to impart shock resilience to the wheel.

Another object of this invention is to provide a wheel comprising a hollow light-weight unitary central portion including a hub and flanges and formed with an axially extending tunnel or channel on its periphery for accommodating the valve stems of tires adapted to be mounted on the rims and for permitting axial movement of the tires and rims on said central portion.

Another object of this invention is to provide a hollow wheel construction in which the aforesaid tunnel formed therein, in addition to being of a form so as to impart added strength to the wheel, is formed to prevent ingress of foreign matter thereinto.

Other objects and advantages will become apparent as the following description proceeds.

To the accomplishment of the foregoing and related ends, said invention, then, comprises the features hereinafter fully described and particularly pointed out in the claims, the following description and the annexed drawing setting forth in detail one illustrative embodiment of the invention, this being indicative, however, of but one of the various ways in which the principle of the invention may be employed.

Figure 1:
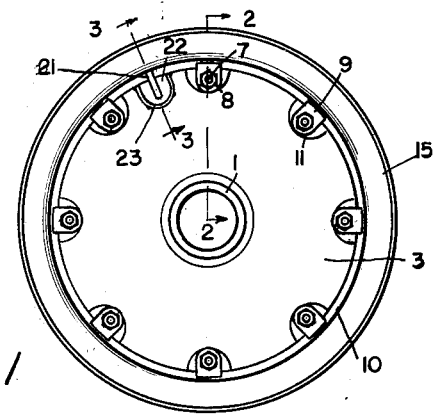
Fig. 1 is a side elevation view of a preferred embodiment of this invention.
Figure 2:
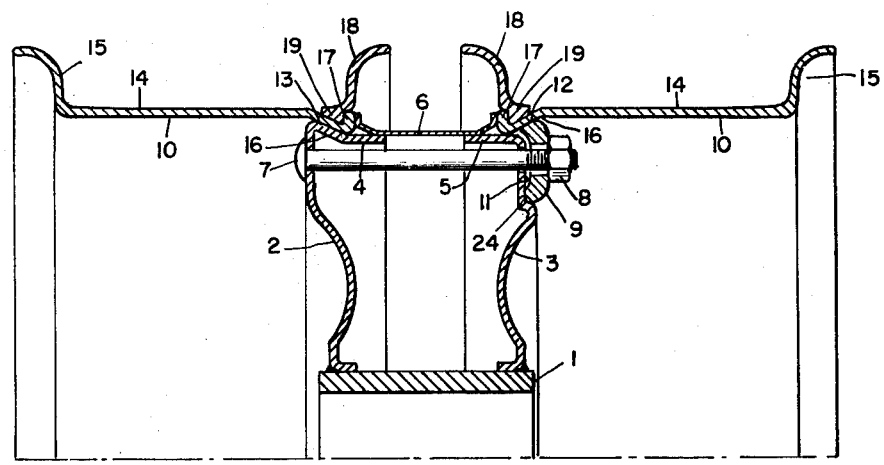
Fig. 2 is a cross section view on a somewhat enlarged scale taken along the line 2—2, Fig. 1.

Referring now to the drawing, the wheel illustrated comprises a hub 1 of relatively small diameter adapted to be connected to a vehicle axle.

Welded or otherwise fixed in axially spaced relation adjacent each end of said hub 1 and projecting radially from the latter are inside and outside rings or flanges 2 and 3 respectively, of pressed steel and appropriately curved in radial cross section, as illustrated, for imparting desired shock absorbing resilience in the wheel. Said inside ring 2 is provided with an axially extending peripheral flange 4 and said outside ring 3 is provided with a similar flange 5 of the same diameter, such flanges extending toward one another for supporting a spacer 6 coaxially thereabout.

Fixed to one of said rings, herein the inside ring 2, near the periphery thereof, are a plurality of circularly arranged bolts 7 which have their threaded ends projecting through similarly arranged openings formed in the outside ring 3. Nuts 8 threaded onto said bolts when tightened are adapted to draw lugs 9 on said bolts in a direction for clamping the hereinafter referred to rims 10 onto the central portion of the wheel, said central portion comprising hub 1 and rings 2 and 3. When lugs 9 such as illustrated are employed the outside ring 3 will be formed with recesses 11 for holding the inclined seats 12 of said lugs in a proper position projecting radially beyond axial flange 5.

In some instances, in lieu of separate lugs 9 it may be desirable to employ an annular clamping ring formed with a conical seating surface corresponding with seats 12 on said lugs. In such case, the recesses in said outer ring are not required. It is to be noted that with lugs 9 it is unnecessary to completely remove nuts 8 in order to assemble or disassemble the wheel because upon predetermined loosening of said nuts lugs 9 may be axially dislodged from recesses 11 and turned to a position with seats 12 thereon disposed radially inward of axial flange 5.

As shown, inside ring 2 is enlarged in diameter at its inner end to provide a conical seat 13 facing seats 12 of lugs 9.

The previously referred to rims 10 are identical in construction but are reversed when assembled onto the aforesaid central portion, each rim 10 comprising a tubular portion 14 of diameter for fitting within a tire adapted to be mounted thereon, said tubular portion including an outwardly projecting flange 15 at one end adapted to be abutted by the adjacent bead of a tire thereon. The other end of each rim 10 is formed with an inwardly constricted portion presenting a conical seat 16 for engagement with the seats 13 and 12 of said inside ring 2 and lugs 9 respectively. Each constricted portion is also formed with a radially outwardly turned lip 17 in which a split snap ring 18 is removably fitted, said ring 18 constituting a flange of shape similar to the aforesaid flange 15 and adapted to be abutted by the other tire bead thereadjacent. Each ring 18 is formed with an inner portion 19 radially overlapping said lip 17 whereby to preclude relative movement of said ring 18 in a direction away from the associated flange 15 of said rim 18. As is apparent, expansion of ring 18 to disengage such radially overlapping surfaces enables axial withdrawal of said ring 18 from rim 10 to enable convenient removal or mounting of a tire on the latter.

Figure 3:
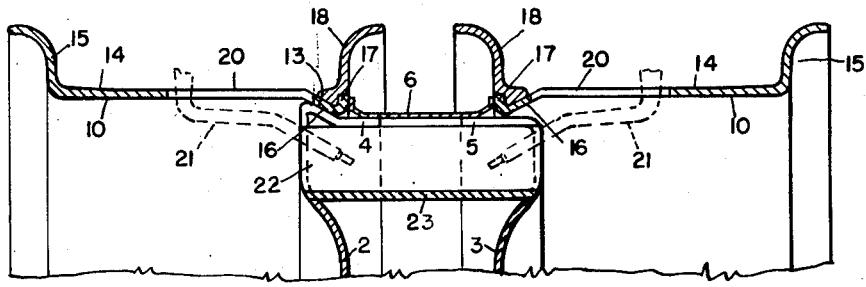
Fig. 3 is a cross section view also on a somewhat enlarged scale taken substantially along the line 3—3, Fig. 1.

As best shown in Fig. 3, each rim 10 is also formed with an axial slot 20 through its tubular portion 14 through which the valve stem 21 of a tire is adapted to project inwardly, said stem usually being of a shape such as illustrated.

For accommodating said valve stems 21, the inside and outside rings 2 and 3 are sheared out to provide a peripheral notch 22 either at one place, as shown, or if preferred at a plurality of equally spaced points around said rings to preserve dynamic balance of the wheel and to provide for mounting of the rims and tires in any of a plurality of rotative positions. In the latter case, the valve stem 21 of one tire may be disposed in another notch whereby each valve stem is more readily accessible for filling the tires.

In order to seal the interior of the wheel against ingress of gravel, dirt, or other foreign matter into the space between the inside and outside rings 2 and 3, a channel-shaped piece of metal 23 is welded in place in such notch 22 to thus form a tunnel or groove which extends axially across the periphery of the central portion of the wheel.

Having thus described one embodiment of the present invention it will be evident that the same may be assembled as follows: First one rim 10 with a tire thereon is axially shifted inward of the central portion with seat 16 of said rim opposed to seat 13 of inside ring 2; then spacer 6 is placed around the central portion adjacent the previously mounted rim; and finally the other rim 10 is positioned onto the central portion with its seat 16 facing outwardly. To securely clamp rims 10 in place on the central portion, lugs 9 are positioned so that the seats 12 thereon are opposed to or facing seat 16 of the outside rim 10 whereupon nuts 8 may be tightened to draw the assembly together with the rim seats 16 in tight frictional engagement with the seats 13 and 12 on inside ring 2 and lugs 9 respectively. It is to be observed that tightening of the nuts 8 as aforesaid also flexes the pressed steel rings 2 and 3 axially toward one another in the manner of cantilevers about the inner edges which are fixed to hub 1 whereby to enable firmer clamping of rims 10 and spacer 6 between seats 12 and 13.

It is to be noted that lugs 9 are each formed with a projection 24 at its inner end engageable with ring 3, functioning as a fulcrum whereby the other end thereof which is formed with seat 12 may be moved toward seat 13 of ring 2 for securely clamping the rims and spacer between such seats.

As shown, spacer 6 prevents axial shifting of rims 10 toward one another thus maintaining them in predetermined axially spaced relation. It is also through said spacer 6 that the inner rim 10 is pressed against its seat 13 on inside ring 2.

The disassembly of the wheel is equally as simple, involving only the loosening or removal of nuts 9 and disengagement of the lug seats 12 from the outer rim seat 16 whereupon both rims 10 and spacer 6 therebetween may be axially withdrawn from the central portion of the wheel.

Other modes of applying the principle of the invention may be employed, change being made as regards the details described, provided the features stated in any of the following claims, or the equivalent of such, be employed.

I therefore particularly point out and distinctly claim as my invention:

1. A wheel comprising a central hub, a pair of axially spaced rings on said hub provided with peripheral flanges of substantially equal diameter extending axially toward one another, one ring being provided with a seat projecting radially outward of such flanges, a member movably mounted adjacent the other ring provided with a seat projecting radially outward of such flanges and facing the seat of said one ring, said member being engageable with said other ring upon movement of said member toward said one ring, means adapted to move said member toward said one ring, a pair of rims respectively encircling said rings, said rims being constricted adjacent one end to provide seats respectively in engagement with the seats of said one ring and member, and a spacer between said rims encircling such peripheral flanges, said rings being of flexible form with their inner edges fixed to said hub and their outer portions free to be flexed toward one another upon movement of said member toward said one ring whereby to clamp said spacer between said rims and to clamp said rims between the seats of said one ring and member.

2. A wheel comprising a central hub, a pair of axially spaced rings on said hub provided with peripheral flanges of substantially equal diameter extending axially toward one another, one ring being provided with a seat projecting radially outward of such flanges, a member movably mounted adjacent the other ring provided with a seat projecting radially outward of such flanges and facing the seat of said one ring, a pair of rims respectively encircling said rings, said rims being constricted adjacent one end to provide seats respectively in engagement with the seats of said one ring and member, a spacer encircling such peripheral flanges and disposed between those ends of said rims which are provided with seats, means adapted to move said member in a direction to cause such seats of said one ring and member to move toward one another to clamp said rims and spacer therebetween, said rings being formed with axially aligned peripheral notches, and an axially disposed channel-shaped member in such notches open at opposite ends and at the periphery of said rings and fixed to said rings at its opposite ends thereby forming an axially extending tunnel across said rings.

3. A wheel comprising a central hub, a pair of axially spaced flexible rings having their inner edges fixed on said hub and provided with peripheral flanges extending axially toward one another, one ring being enlarged at the juncture of its peripheral flange therewith to provide a seat facing toward such peripheral flange, one rim fitted over said one ring and provided with an inturned seat at one end engaged with the seat on said one ring, a bolt extending axially from said one ring through the other ring, a nut threaded on said bolt, a lug movable on said bolt by said nut, said lug being located adjacent that side of said other ring which is remote from the peripheral flange thereof and provided with a seat disposed radially outward of such peripheral flange and facing the seat on said one ring, another rim fitted over said other ring provided with an inturned seat at one end engaged with the seat on said lug, and a spacer encircling such peripheral flanges and disposed between those ends of said rims which are provided with inturned seats, said rings having their outer portions free to be flexed toward one another upon turning of said nut in a direction to cause such seats to move toward one another.

4. A wheel comprising a central hub, a pair of axially spaced rings on said hub provided with peripheral flanges extending axially toward one another, one ring being enlarged at the juncture of its peripheral flange therewith to provide a seat facing toward such peripheral flange, one rim fitted over said one ring and provided with an inturned seat at one end engaged with the seat on said one ring, a bolt extending axially from said one ring through the other ring, a nut threaded on said bolt, a lug movable on said bolt by said nut, said lug being located adjacent that side of said other ring which is remote from the peripheral flange thereof and provided with a seat disposed radially outward of such peripheral flange and facing the seat on said one ring, another rim fitted over said other ring provided with an intuned seat at one end engaged with the seat on said lug, and a spacer encircling such peripheral flanges and disposed between those ends of said rims which are provided with inturned seats, said rings having their outer portions free to be flexed toward one another upon turning of said nut in a direction to cause such seats to move toward one another to clamp said rings and spacer therebetween.

5. A wheel comprising a central hub, a pair of axially spaced rings on said hub provided with peripheral flanges extending axially toward one another, one ring being enlarged at the juncture of its peripheral flange therewith to provide a seat facing toward such peripheral flange, one rim fitted over said one ring and provided with an inturned seat at one end engaged with the seat on said one ring, a bolt extending axially from said one ring through the other ring, a nut threaded on said bolt, a lug movable on said bolt by said nut, said lug being located adjacent that side of said other ring which is remote from the peripheral flange thereof and provided with a seat disposed radially outward of such peripheral flange and facing the seat on said one ring, another rim fitted over said other ring provided with an inturned seat at one end engaged with the seat on said lug, a spacer encircling such peripheral flanges and disposed between those ends of said rims which are provided with inturned seats, said rings being formed with aligned peripheral notches therethrough, and a channel-shaped member in such notches open at both ends and at the periphery of said rings and extending axially from one ring to the other.

HOMER L. MUELLER.

REFERENCES CITED

The following references are of record in the file of this patent:

UNITED STATES PATENTS

| Number | Name | Date |
|---|---|---|
| 1,068,572 | Dean | July 29, 1913 |
| 1,440,435 | Barry | Jan. 2, 1923 |
| 1,443,291 | Swain | Jan. 23, 1923 |
| 1,791,128 | Hadfield | Feb. 3, 1931 |
| 1,984,048 | Walther | Dec. 11, 1934 |
| 2,117,926 | Walther | May 17, 1938 |
| 2,427,378 | Ash | Sept. 16, 1947 |
| 2,552,081 | Ash | May 8, 1951 |

FOREIGN PATENTS

| Number | Country | Date |
|---|---|---|
| 90,950 | Austria | Jan. 25, 1923 |